United States Patent [19]

Audeh

[11] Patent Number: 4,647,287
[45] Date of Patent: Mar. 3, 1987

[54] RECOVERY OF SULFUR FROM SULFUR FROTH

[75] Inventor: Costandi A. Audeh, Princeton, N.J.

[73] Assignee: Mobil Oil Corporation, New York, N.Y.

[21] Appl. No.: 676,995

[22] Filed: Nov. 30, 1984

[51] Int. Cl.⁴ .............................................. C01B 17/05
[52] U.S. Cl. ............................... 23/293 S; 23/313 R; 210/728; 423/574 L
[58] Field of Search ......................... 23/293 S, 313 R; 423/574 L, 575; 210/710, 716, 728, 737; 209/5

[56] References Cited

U.S. PATENT DOCUMENTS

| 3,020,231 | 2/1962 | Colwell et al. | 209/5 |
| 3,617,561 | 11/1971 | Fanselow | 210/716 |
| 3,862,335 | 1/1975 | Renault et al. | 423/575 |
| 4,508,537 | 4/1985 | Fenton et al. | 23/293 S |
| 4,518,576 | 5/1985 | Diaz | 23/293 S |
| 4,534,955 | 8/1985 | Rosenbaum | 23/293 S |
| 4,536,294 | 8/1985 | Guillet et al. | 209/5 |

Primary Examiner—David L. Lacey
Attorney, Agent, or Firm—Alexander J. McKillop; Michael G. Gilman; Charles A. Malone

[57] ABSTRACT

A sour gas obtained from an enhanced oil recovery is converted to sulfur slurry which is concentrated for easy filtration, or for direct disposal, by the addition of substantially small amounts of a solid flocculating agent e.g. clay, optionally in combination with selected suitable conventional liquid polymer flocculants. For this purpose, bentonite has been shown to be a particularly effective solid flocculating agent.

20 Claims, 3 Drawing Figures

RECOVERY OF SULFUR FROM SULFUR FROTH

FIELD OF THE INVENTION

This invention is directed to a method for the recovery of sulfur from a slurry containing same.

BACKGROUND OF THE INVENTION

When recovering hydrogen sulfide from oil sour gas, hydrogen sulfide is usually oxidized to elemental sulfur. One process which can be utilized is based on the use of ferric ions in an alkaline solution and may be represented by the following equation:

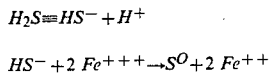

$$HS^- + 2\, Fe^{+++} \rightarrow S^O + 2\, Fe^{++}$$

After the formation of elemental sulfur, the reduced oxidant, $Fe^{++}$, is oxidized by blowing air to $Fe^{+++}$.

In one process for recovering sulfur, the sulfur recovery section includes a settling tank and a melter-settler. In the sulfur melting step, oxidant loss, sulfur discoloration and plugging have been observed and are undesirable.

In order to avoid the undesirable consequences of melting the sulfur, it is possible to recover the sulfur by separation from the mother liquor by filtration or centrifugation. However, for such separation techniques to be effective, it is desirable to have a sulfur slurry with a fairly consistent solids content of about 20 weight percent.

During the airblowing step previously mentioned, where $Fe^{++}$ is oxidized to $Fe^{+++}$, the sulfur and the mother liquid becomes a "froth". Since the flow of hydrogen sulfide into the process is variable, the concentration of sulfur in the froth varies from less than about 1 wt. % to about 20 wt. %. Therefore, what is needed is a method to produce a uniformly consistent concentration of sulfur in a slurry which will settle in a reasonable amount of time in order to avoid the undesirable consequences of melting the sulfur.

SUMMARY OF THE INVENTION

This invention is directed to a method for concentrating sulfur suspended in a liquid medium by the use of a clay. To accomplish this, clay is mixed with the sulfur suspended in the liquid medium for a time sufficient to obtain proper mixing. After mixing, the mixture is allowed to settle for from about 2 to about 5 hours at a temperature of from about 24° C. (75° F.) to about 45° C. (113° F.). After the sulfur has separated from the liquid medium, the liquid medium or mother liquor is removed from the consolidated sulfur which has settled. Prior to removing the mother liquor, the sulfur settles in a preferred amount of about 15 to about 40 wt. % sulfur. After the mother liquor has been removed, the sulfur which has settled is either centrifuged or filtered. If the sulfur which has settled is in a concentration of about 35 to about 45 wt. %, the sulfur and the slurry can be removed and sold commercially.

In a preferred embodiment, the clay comprises bentonite which is mixed with the liquor containing the suspended sulfur in an amount from about 750 ppm to about 1200 ppm, preferably about 1000 ppm. The mixture is maintained at a temperature of from about 10° C. (50° F.) to about 45° C. (113° F.). After a settling time of from about 0.25 hours to about 5 hours, the sulfur is concentrated to from about 25 to about 45 wt. %. The mother liquor is removed from the mixture. However, if the mixture contains from about 40 to about 45 wt. % sulfur, the mixture is in a concentration which can be transported and sold commercially. If the concentration of the sulfur is less than from about 15 to about 30 wt. %, the sulfur is removed from the slurry by centrifugation or filtration. The mother liquor is then removed and recycled for further processing.

It is therefore an object of this invention to obtain an undiscolored sulfur.

It is a further object of this invention to avoid the melter-settler step with this attendant oxidant loss and associated plugging problems.

It is a still further object of this invention to reduce the volume of sulfur slurry and avoid containment problems.

It is a yet further object of this invention to concentrate sulfur slurry in an amount sufficient for economical transportation and coamercial sale.

DESCRIPTION OF THE PREFERRED EMBODIMENTS

Hydrogen sulfide can be separated from sour gases by selective removal using alkali liquids. The alkali liquids may be selected from many aqueous solutions of hydroxides, organic basis, such as alkanolamines, alkanoldiamines and alkenylpolyamines. Alkali metal hydroxides and alkanolamines are preferred, particularly diethanolamine and N-methyldiethanolamine, which show high selectivity towards hydrogen sulfide and not carbon dioxide.

Pursuant to this separation, elemental sulfur is formed by oxidation of the hydrogen sulfide. After the formation of elemental sulfur, the reduced oxidant is oxidized for re-use. When ferrous ions are the reduced species they are oxidized by blowing with air to make ferric ions.

During the air blowing step, where ferrous ions are oxidized to ferric ions, the sulfur in the mother liquid becomes a "froth". When or if the flow of hydrogen sulfide into the process is variable, the concentration of sulfur in the froth will vary from less than about 1 wt. to about 20 wt. %. In order to avoid the low concentration of sulfur in the slurry, the sulfur contained in the froth is concentrated so as to avoid storage problems.

Figure 1:
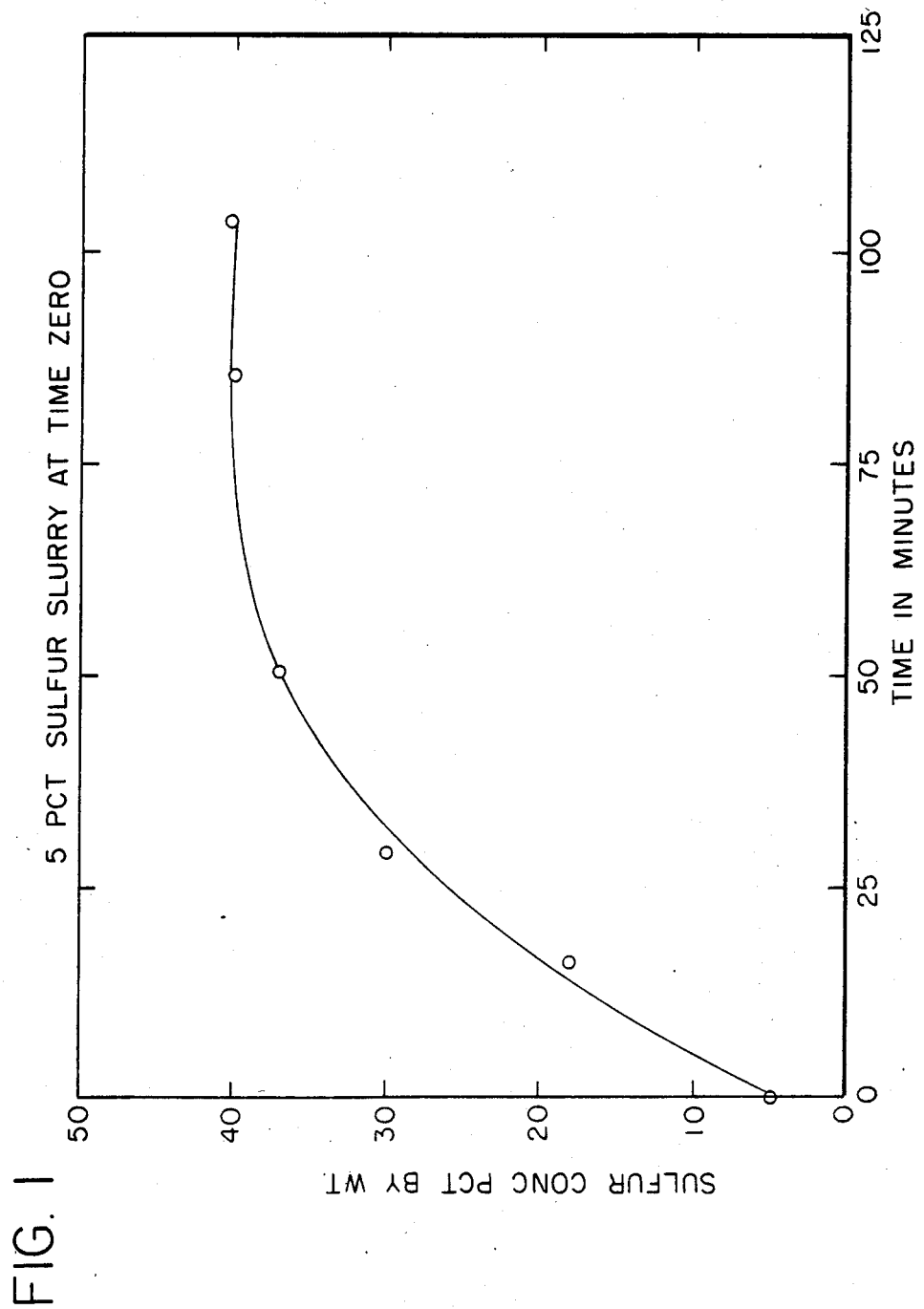
FIG. 1 is a graph which depicts the settling and concentration times of a 5% sulfur slurry.
Figure 2:
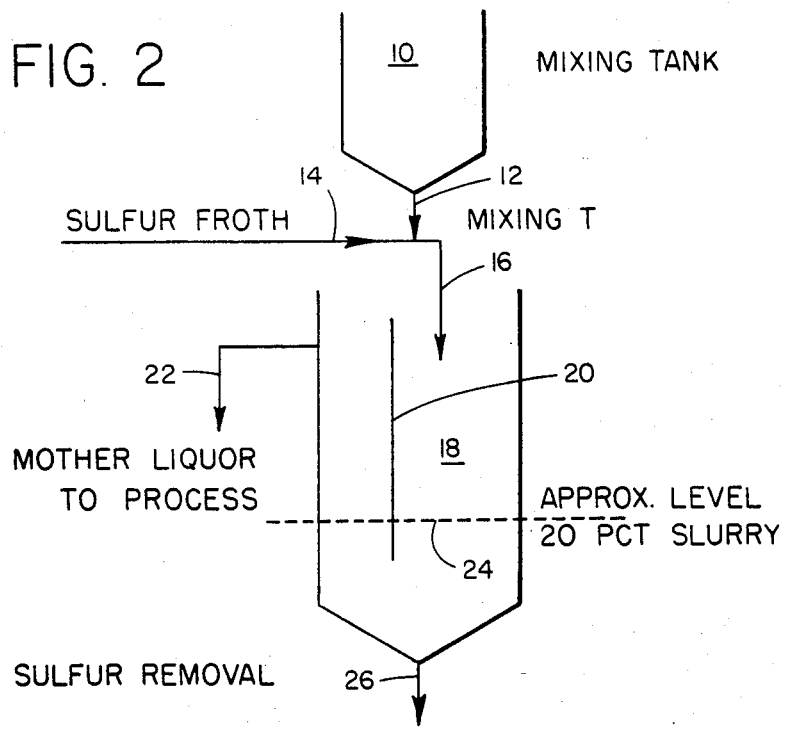
FIG. 2 depicts a clay mixing and suspended sulfur settling process for sulfur separation.

In the practice of this invention, referring to FIG. 2, a solid floculating agent, preferably a clay for example, ball clay or bentonite, is mixed in tank 10 in an aqueous solution. From tank 10 the clay mixture is led via line 12 into a mixing T where it mixes with the sulfur froth coming through line 14. The sulfur froth is of a concentration of from about 1 wt. % to about 5 wt. %. Upon mixing with the sulfur froth, the mixture containing the clay is led via line 16 into tank 18 where it is allowed to settle at a temperature of from about 10° C. (50° F.) to about 45° C. (113° F.), preferably about 42° C. (108° F.). The mixture is allowed to remain in the tank for a time sufficient to obtain settling of the sulfur. Generally this will be from about 0.25 hours to about 5 hours, preferably about 2 hours. FIG. 1 shows a graphical illustration of these results. After the sulfur has settled to the desired concentration, the mother liquid is removed from the tank via line 22 where it is recycled back into the process.

Figure 3:
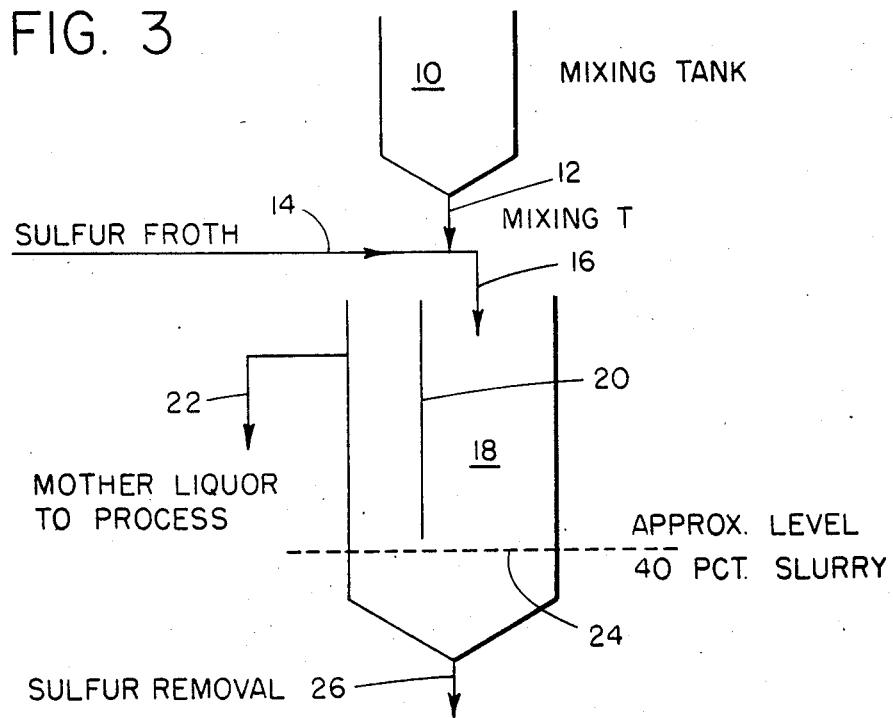
FIG. 3 depicts a clay mixing and suspended sulfur settling process for facilitating the commercial sale of sulfur.

Depending upon the operating conditions, the slurry can be allowed to concentrate at from about 20 wt. % to about 45 wt. %, preferably about 40 wt. %. Where it becomes necessary, a sulfur slurry containing from about 15 wt. % to about 25 wt. %, preferably about 20 wt. %, can be removed from tank 18 by line 26 where it will undergo centrifugation or filtration to remove excess water therefrom. This is shown in FIG. 2. Where operating conditions permit, the sulfur slurry can be concentrated and consolidated up to about 45 wt. %, where it can then be removed along with the water and sold commercially. This is shown in FIG. 3.

In order to obtain the optimum results for concentrating the sulfur slurry, it is preferred to have the solid flocculating agent added into the slurry, containing about 5 wt. % sulfur, in an amount of from about 750 ppm to about 1250 ppm, preferably about 1000 ppm. The most effective temperature at which to conduct the sulfur concentration and consolidation is at from about 10° C. (50° F.) to about 42° C. (108° F.).

In another emodiment of this invention, the sulfur slurry containing about 5 wt. % sulfur is mixed with bentonite and a liquid polymer flocculating agent. Suitable liquid polymer flocculating agents can be obtained from commercial producers as is known to those skilled in the art. For example, a suitable agent is the Magnifloc TM polymer obtainable from American Cyanaxid located at Wyyne, N. J.

When preparing a bentonite/Magnifloc polymeric flocculant mixture, the method of preparation will have a significant and critical effect upon the results obtained in the process. To obtain the best results, a 10 wt. % bentonite paste is mixed with water. This mixture is then combined with a required amount of Magnifloc flocculant solution in water with the paste in an amount of from about 0.001% by weight to about 0.2% by weight. One part of this mixture is then diluted with nine parts of water. The resultant mixture is subsequently combined with the sulfur slurry. Afterwards, the process is conducted as mentioned above to obtain the desired concentration and consolidation of sulfur from the slurry. For optimum results, about 1000 ppm of bentonite and about 10 ppm of Magnifloc E-1285 liquid polymer flocculant should be added to the 5 wt. % sulfur slurry. As is known to those skilled in the art, Magnifloc E-1285 polymer is a highly active, high molecular weight, high cationicity, liquid flocculant often used in sludge conditioning and waste treatment processes. After mixing with said slurry, a 20% sulfur slurry is produced in less than about 2 hours. This combination gives a consolidated sulfur layer. Furthermore, no sulfur adheres to the walls of the vessel.

Referring to FIG. 1, the relationship between the estimated concentration time of a 5 wt. % sulfur slurry is depicted. As shown in FIG. 1, most of the sulfur forms a precipitate in a short time and the precipitate then consolidates into a more compact layer. After about one hour, further compaction is minimum. Even upon standing for about 24 hours, the sulfur concentration in the consolidated sediment increases only from about 40% by weight to about 50% by weight.

The examples which follow show the effectiveness of the process described above.

EXAMPLE 1

A 25 ml sample of 5% sulfur froth was allowed to stand at 42° C. (108° F.) for a period of about eight hours. Little or no settling was observed in the settling vessel.

EXAMPLE 2

A 22.5 ml sample of a 5 wt. % sulfur froth was mixed with 2.5 cc of a slurry made from 1% by wt. Tennessee Ball Clay #10 and the mixture allowed to stand for about 5 hours at 42° C. (108° F.). The sample separated into a 6 ml layer containing about 20 wt. % sulfur and a mother liquor containing 0.4 wt. % sulfur.

EXAMPLE 3

A 22.5 ml sample of a 5 wt. % sulfur froth was mixed with 2.5 ml of a 1% by wt. slurry made from 10% by wt. bentonite paste and the mixture allowed to stand for about 5 hours at 42° C. C. (108° F.). The sample separated into a 6 ml layer containing 20 wt. % sulfur and a mother liquor containing 0.4 wt. % sulfur.

EXAMPLE 4

A repeat of Example 3, however, the temperature was 24° C. (75° F.). The same result was observed as that of Example 3.

EXAMPLE 5

A 22.5 ml sample of a 5 wt. % sulfur froth was mixed with 2.5 ml of a solution which had a flocculant concentration of 0.001 wt. % and the mixture allowed to stand at 42° C. (108° F.). No separation was observed.

EXAMPLE 6

A 22.5 ml sample of a 5% wt. sulfur froth was mixed with 2.5 ml of a 1% by wt. slurry made from 10% by wt. bentonite, which had been impregnated with 0.01 wt. % of the same chemical flocculant used in Example 5, and the mixture allowed to stand at 42° C. (108° F.). In less than one hour a 6 ml layer equivalent to about ¼ the volume of the test container developed. This corresponds to a 4-fold concentration of the sulfur, i.e. about 20 wt. %. After a 2-hour settling period, this layer became more dense and occupied a volume which corresponded to about ⅛ the volume of the test container. This layer of sulfur contained about 40% by weight sulfur and the mother liquor contained about 0.7% by wt. sulfur.

Although the present invention has been described with preferred embodiments and examples, it is to be understood that modifications and variations may be resorted to without departing from the spirit and scope of this invention, as those skilled in the art will readily understand. Such modifications and variations are considered to be within the purview and scope of the appended claims.

What is claimed is:
1. A method for concentrating sulfur suspended in a liquid medium comprising:
  (a) mixing clay with a solution of a polymeric flocculating substance and subsequently combining the mixture with an aqueous solution containing sulfur suspended therein; and
  (b) allowing sufficient time for the concentration and consolidation of sulfur to take place.

2. The method as recited in claim 1 wherein said clay is bentonite in an amount of about 10 wt. % which is then subsequently mixed with said polymeric solution in an amount from about 0.001 wt. % to about 0.2 wt. % and is then subsequently diluted with one part of the combined mixture to nine parts of water, for mixing with said aqueous solution containing sulfur.

3. The method as recited in claim 1 where in step (a) said clay is bentonite which is mixed in combination with said solution of polymeric substance in a concentration of about 1000 ppm bentonite to about 10 ppm of the polymeric substances in liquid solution.

4. The method as recited in claim 1 wherein in step (a) said clay and the polymeric solution combine to produce about a 20 wt. % sulfur slurry by consolidation in less than about 2 hours.

5. A method for removing and concentrating sulfur suspended in a liquid medium which sulfur is obtained from the oxidation of hydrogen sulfide contained in a sour gas comprising:
    (a) combining said sulfur with a liquid to obtain a liquid containing suspended sulfur therein;
    (b) mixing clay with said liquid containing suspended sulfur therein for a time and at a temperature sufficient to concentrate said sulfur;
    (c) allowing sufficient time for the concentrated sulfur to concentrate and consolidate; and
    (d) removing said concentrated and consolidated sulfur.

6. The method as recited in claim 5 where in step (a) said liquid contains sulfur in a concentration of about 5 wt. %.

7. The method as recited in claim 5 wherein the concentration and consolidation time is from about 0.25 hours to about 5 hours.

8. The method as recited in claim 5 wherein the temperature during said concentration and consolidation is from about 10° C. (50° F.) to about 45° C. (113° F.).

9. The method as recited in claim 5 where the concentration of the sulfur in step (b) is increased to about four times the amount contained in the initial liquid medium by removing excess water therefrom.

10. The method as recited in claim 5 wherein the sulfur is concentrated and consolidated in an amount of from about 15% by weight to about 45% by weight.

11. The method as recited in claim 5 where in step (a) said clay is bentonite.

12. The method as recited in claim 5 where in step (a) said clay is ball clay.

13. The method as recited in claim 5 where in step (a) said clay is bentonite which is mixed with said slurry, in a concentration from about 750 ppm to about 1250 ppm.

14. The method as recited in claim 5 where in step (b) after consolidation and concentration, the sulfur containing less than about 15 wt. % to about 35 wt. % is separated by centrifugation or filtration, and the sulfur which contains about 40 wt. % is removed as a slurry for commercial sale.

15. A method for removing and concentrating sulfur suspended in a liquid medium which sulfur is obtained from the oxidation of hydrogen sulfide containing in a sour gas comprising:
    (a) combining said sulfur with water to obtain an aqueous solution containing suspended sulfur therein;
    (b) mixing clay with a solution of a polymeric flocculating substance and subsequently combining the mixture with said aqueous solution containing sulfur suspended therein;
    (c) allowing sufficient time for the concentration and consolidation of sulfur to take place; and
    (d) removing said concentrated and consolidated sulfur.

16. The method as recited in claim 15 where said clay is bentonite in an amount of about 10 wt. % whichi s then subsequently mixed with said polymeric solution in an amount from about 0.001 wt. % to about 0.2 wt. % and is then subsequently diluted with one part of the combined mixture to nine parts of water, for mixing with said aqueous solution containing sulfur.

17. The method as recited in claim 15 where in step (a) said clay is bentonite which is mixed in combination with the solution of polymeric substances in a concentration of about 1000 ppm bentonite to about 10 ppm of the polymeric substances in liquid solution.

18. The method as recited in claim 15 where in step (b) said clay and the polymeric solution combine to produce about a 20 wt. % sulfur slurry in less than about 2 hours.

19. The method as recited in claim 15 where in step (b) the temperature during said concentration and consolidation is from about 10° C. (50° F.) to about 45° C. (113° F.).

20. The method as recited in claim 15 where in step (a) said aqueous solution contains sulfur in a concentration of about 5 wt. %.

* * * * *